(12) United States Patent
DeBruine

(10) Patent No.: US 7,043,644 B2
(45) Date of Patent: May 9, 2006

(54) FACILITATING FILE ACCESS FROM FIREWALL-PROTECTED NODES IN A PEER-TO-PEER NETWORK

(75) Inventor: Timothy S. DeBruine, Santa Clara, CA (US)

(73) Assignee: Qurio Holdings, Inc., Peterborough, NH (US)

( * ) Notice: Subject to any disclaimer, the term of this patent is extended or adjusted under 35 U.S.C. 154(b) by 825 days.

(21) Appl. No.: 09/773,314

(22) Filed: Jan. 31, 2001

(65) Prior Publication Data

US 2002/0103998 A1    Aug. 1, 2002

(51) Int. Cl.
*G06F 11/30* (2006.01)
(52) U.S. Cl. ................. 713/200; 713/162; 713/165; 713/153; 713/154
(58) Field of Classification Search ............. 713/200, 713/201, 162, 165, 153, 154
See application file for complete search history.

(56) References Cited

U.S. PATENT DOCUMENTS 6,052,718 A * 4/2000 Gifford ................. 709/219

OTHER PUBLICATIONS

D. Brent Chapman and Elizabeth D. Zwicky ; Firewall design—Here's a practical guide on how to protect your networks; Jan. 1, 1996 http://sunsite.nstu.nsk.su/sunworldonline/swol-01-1996/swol-01-firewall.html, Retreived on Sep. 14, 2004.*

* cited by examiner

*Primary Examiner*—Thomas R. Peeso
(74) *Attorney, Agent, or Firm*—Withrow & Terranova, PLLC

(57) ABSTRACT

A method and system for facilitating file access in a peer-to-peer network. The peer-to-peer network includes a plurality of nodes, where a portion of the nodes are separated from the network by a firewall device. The method and system include designating a first node on the network that is not firewall protected to act as a proxy server. In response to determining that a second node is protected by a firewall, the second node is instructed to establish a connection with the proxy server. An open connection request is then sent from the second node to the proxy server. In response to receiving a request from a third node to access a file on the second node, the method and system further include instructing the third node to send the request to the proxy server. The proxy server is then used to forward the request to the second node as a response to the open connection request, thereby allowing other nodes to access files on the second node despite the presence of the firewall.

21 Claims, 8 Drawing Sheets

FACILITATING FILE ACCESS FROM FIREWALL-PROTECTED NODES IN A PEER-TO-PEER NETWORK

FIELD OF THE INVENTION

The present invention relates to peer-to-peer networks, and more particularly to a method and system for facilitating file access from firewall-protected client nodes in a peer-to-peer network.

BACKGROUND OF THE INVENTION

The Internet may be viewed as containing distributed information and centralized information. The distributed information is located throughout the Internet and typically takes the form of domain name servers, IP addresses, and email addresses, for instance. The centralized information is content, such as web pages and files, which is stored on and served by central servers.

Gaining access to such centralized content, however, is becoming increasingly difficult due to growing Internet congestion, limited bandwidth, and increasing file sizes, especially for media rich content. Traditional Internet technologies for distributing content, such as e-mail, streaming media, and FTP, have proven inadequate. E-mail is inadequate because due to the number of email messages and attachments passing through email servers, restrictions are placed on the sizes of emails that restricts what can be sent as attachments. E-mail also has security issues. PGP encryption is available for securing e-mails, but is not widely adopted.

Streaming media has the disadvantages of not working with all file types and is expensive because providers must purchase different software for the various streaming media standards. Streaming media also has not proven to be a reliable transfer method. And FTP file transfers also has disadvantages, which include being technically challenging to most users, and suffering from inefficient transfers. There are other solutions for distributing content, but they are usually proprietary and do not scale well.

Another problem with distributing centralized content is cost. As file sizes increase, the distribution of content is becoming increasingly expensive for content providers due to metered pricing of used bandwidth. In metered pricing, a content provider's Internet-Service-Provider (ISP) monitors the output of the servers used to provide the content, and charges the content provider 95% of the peak usage even though the average output is much lower. Thus, the cost of distributing content from central servers is one reason why attempts have been made to decentralize content.

One way to decentralize content is through peer-to-peer networks. Peer-to-peer network computing is a more efficient means for distributing resources and content over the Internet. In a peer-to-peer network, all workstations and computers in the network may act as servers to all other users on the network. Some peer applications gain efficiencies by aggregating the distributed storage capacity of the computers across the network, such as Napster™ and Gnutella™, or aggregating the idle computing cycles of the computers, such as SETI@home™. Still others, such as instant messaging, take advantage of the direct network connections that peer devices can make to enhance communications.

Although peer networks are effective, current peer networks have disadvantages. With Napster for example, file downloads are unreliable, resulting in broken connections and incompletely delivered files. In addition, users cannot authenticate other users. There are other problems inherent with such networks, such as the inability to serve files from nodes protected by firewalls to other nodes in the network. Firewalls allow computers behind the firewall to send messages to computers on the Internet, but block incoming messages from reaching the computers behind the firewall. In peer-to-peer networks that have many local area networks protected by firewalls, the amount of file sharing over the peer-to-peer can be greatly reduced.

Accordingly, what is needed is a peer network that facilitates file access to firewall-protected nodes. The present invention addresses such needs.

SUMMARY OF THE INVENTION

The present invention provides a method and system for facilitating file access in a peer-to-peer network. The peer-to-peer network includes a plurality of nodes, where a portion of the nodes are separated from the network by a firewall device. The method and system include designating a first node on the network that is not firewall protected to act as a proxy server. In response to determining that a second node is protected by a firewall, the second node is instructed to establish a connection with the proxy server. An open connection request is then sent from the second node to the proxy server. In response to receiving a request from a third node to access a file on the second node, the method and system further include instructing the third node to send the request to the proxy server. The proxy server is then used to forward the request to the second node as a response to the open connection request, thereby allowing other nodes to access files on the second node despite the presence of the firewall.

According to the present invention, nodes in the P2P network are configured to automatically act as proxy servers when requested in a manner that is transparent to the user of the client node. The present invention reduces cost to operate the P2P by amortizing the cost of the proxies and not explicitly setting up and maintaining dedicated proxy servers.

DETAILED DESCRIPTION

The present invention relates to facilitating file access on peer-to-peer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a secure e-delivery network for large files, both commercial and private. The network enables secure and reliable peer-to-peer file sharing between client nodes where users may share content using both 1-to-1 and 1-to-many file transfers without the need for going through a server. The method for transferring files is secure, works through firewalls, and tolerates network outages. The network also enables subscription-based decentralized file downloads to the client nodes, where users may schedule delivery of content over the network on a fee and non-fee basis.

Figure 1A:
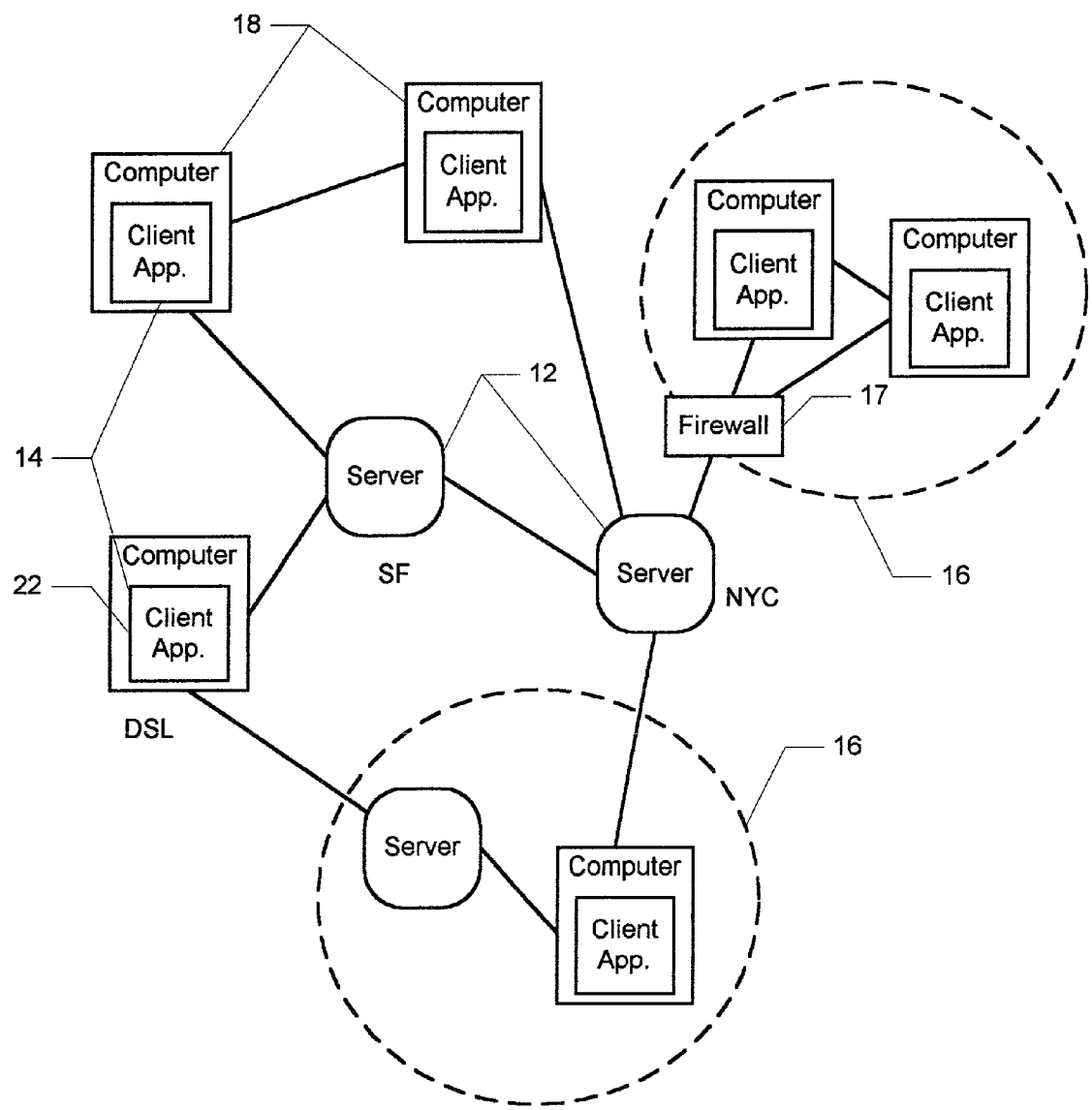
FIGS. 1A and 1B are block diagrams illustrating a peer-to-peer (P2P) network architecture.
Figure 1B:
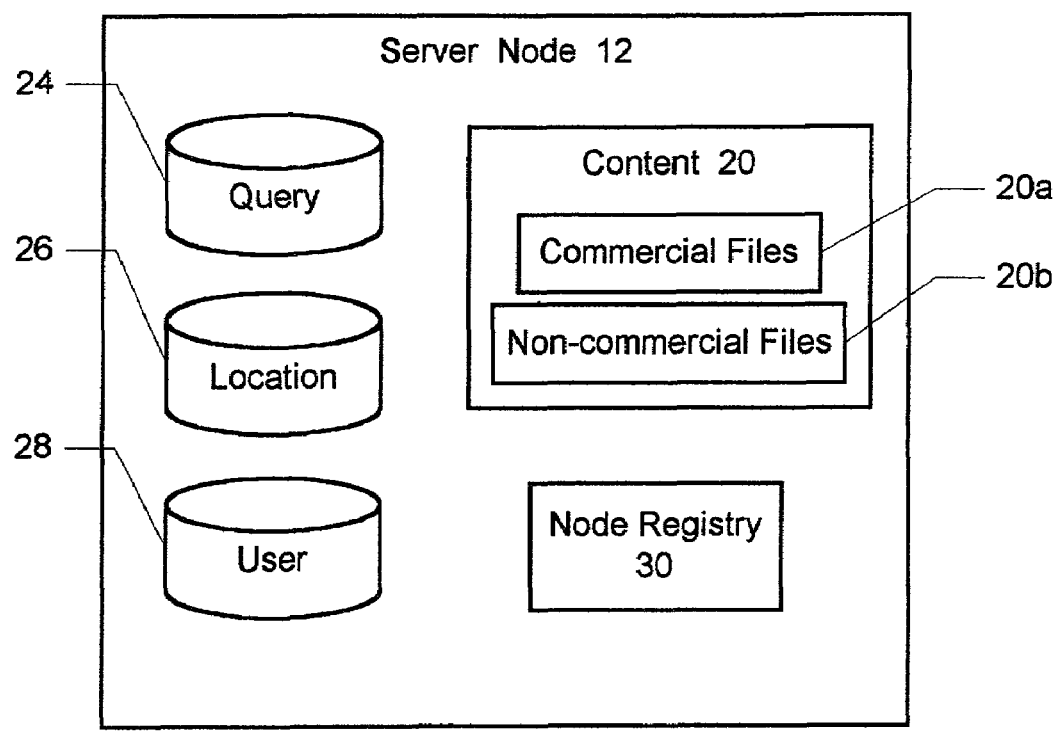

FIGS. 1A and 1B are block diagrams illustrating a peer-to-peer (P2P) network architecture in accordance with one preferred embodiment of the present invention. The peer-to-peer network 10 includes a plurality of computers 18 interconnected over a network, such as Internet, where some of the computers 18 are configured as server nodes 12, and other computers 18 are configured as client nodes 14. A client node 14 may represent a single computer or a proprietary network, such as AOL, or a cable network, for example, and in a preferred embodiment, the server nodes 14 are located worldwide.

Any combination of server nodes 12 and client nodes 14 may form a private network 16, such as a local area network (LAN) or an extranet, which is a private network that uses the public Internet as its transmission system, but requires passwords to gain entrance. Some of the private networks 16 may be protected by a firewall 17. Firewalls 17 are widely used to give users of a private network 16 access to the Internet in a secure fashion as well as to separate a company's public web server from its internal network.

The primary purpose of the peer-to-peer network 10 is the propagation of content files over the network 10. FIG. 1B is a diagram illustrating contents of the server nodes 12. In a preferred embodiment, each server node 12 stores content 20 that comprises both commercial files 20a and noncommercial files 20b. Both a publisher of the content 20 and a recipient of the content 20 have a vested interest in secure and reliable delivery of the content 20. Example type of content files may include audio files, video files, news articles and online magazines, image files, and confidential documents, for instance. Once the content files have been downloaded from the server 12 to client nodes 14, the client nodes 14 serve the files directly to other client nodes 14. Thus, a need exist in the peer-to-peer network to allow each node 14 in the network 10 to share files with other nodes 14 in the network, regardless of whether two nodes 14 are separated by a firewall 17.

The present invention provides a file sharing peer-to-peer network in which content files 20 are propagated throughout the network by enabling each node to serve the content 20 directly to all other nodes on the network 10, even where the nodes 14 are separated by a firewall 17. The present invention facilitates file access in the peer-to-peer network by allowing nodes 12 and 14 on the network 10 to serve as proxies to the private networks 16 so that the client nodes inside the private networks 16 can share files over the network 10 through the firewalls 17.

As shown in FIG. 1B, in a preferred embodiment of the present invention, each server node 12 includes several databases for implementing the functions described above.

The server node 12 includes a query database 24, a location database 26, and a user database 28. The query and a location databases 24 and store the names and locations of the files shared on the network, respectively. And the user database 32 includes account information for the users of the client nodes 14. In accordance with the present invention, the server node 12 also includes a node registry 30, which is responsible for designating nodes 12 as proxy servers.

Before describing the creation and use of proxy servers in accordance with the present invention, a general overview of the operation of the file sharing network will be provided.

Figure 2A:
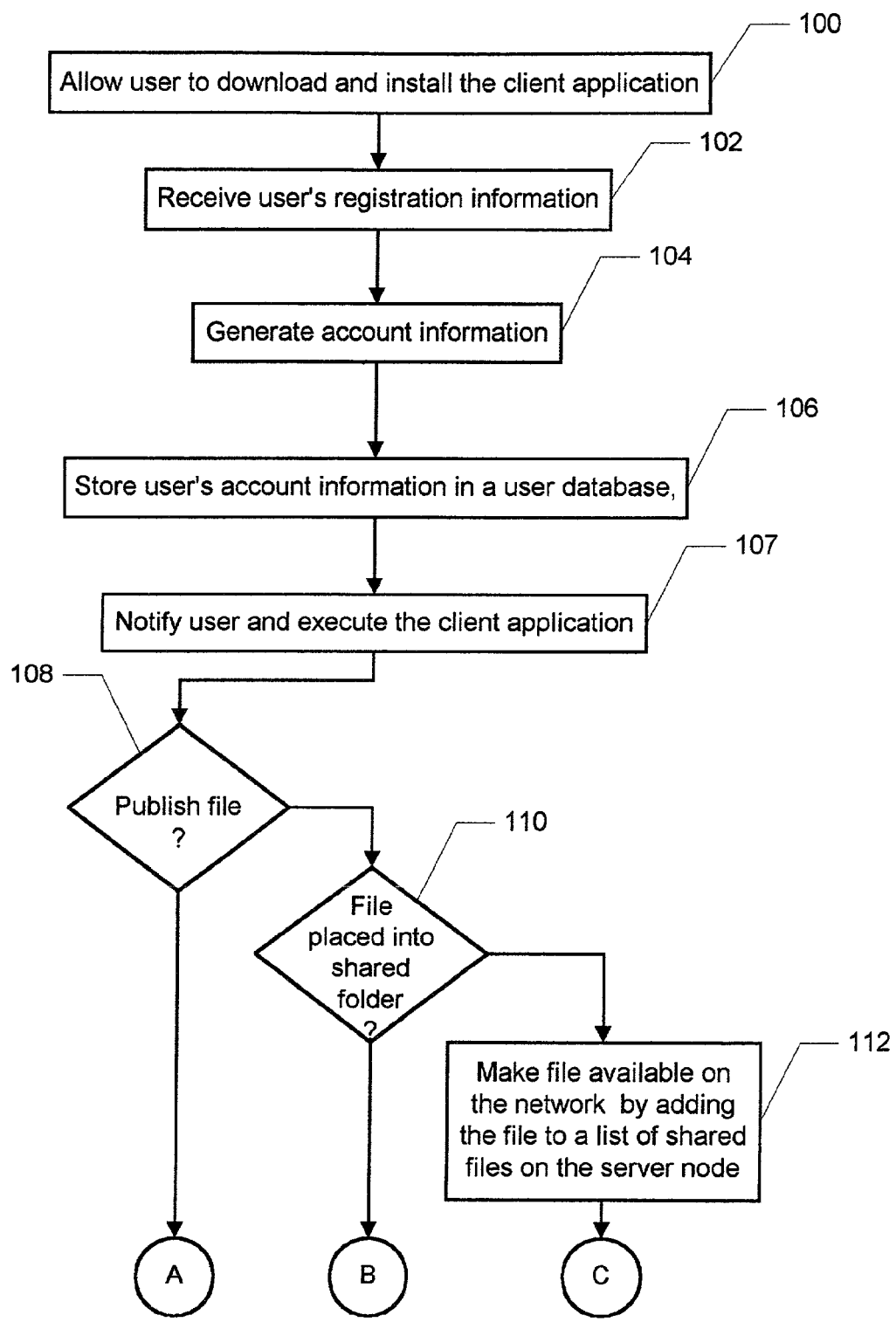
FIGS. 2A–2C are flow charts illustrating the process for providing secure and reliable file sharing in a peer-to-peer network.
Figure 2B:
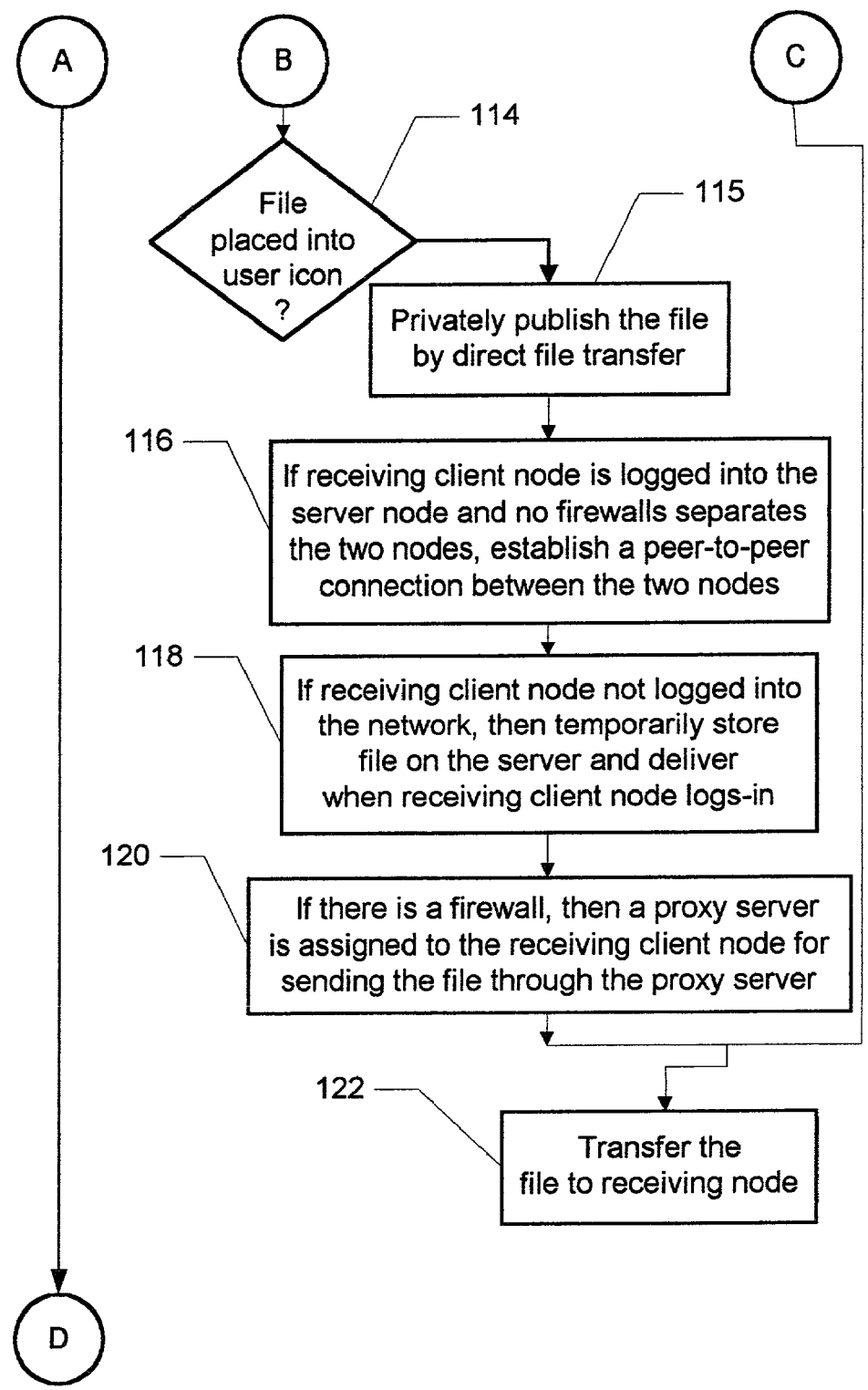
Figure 2C:
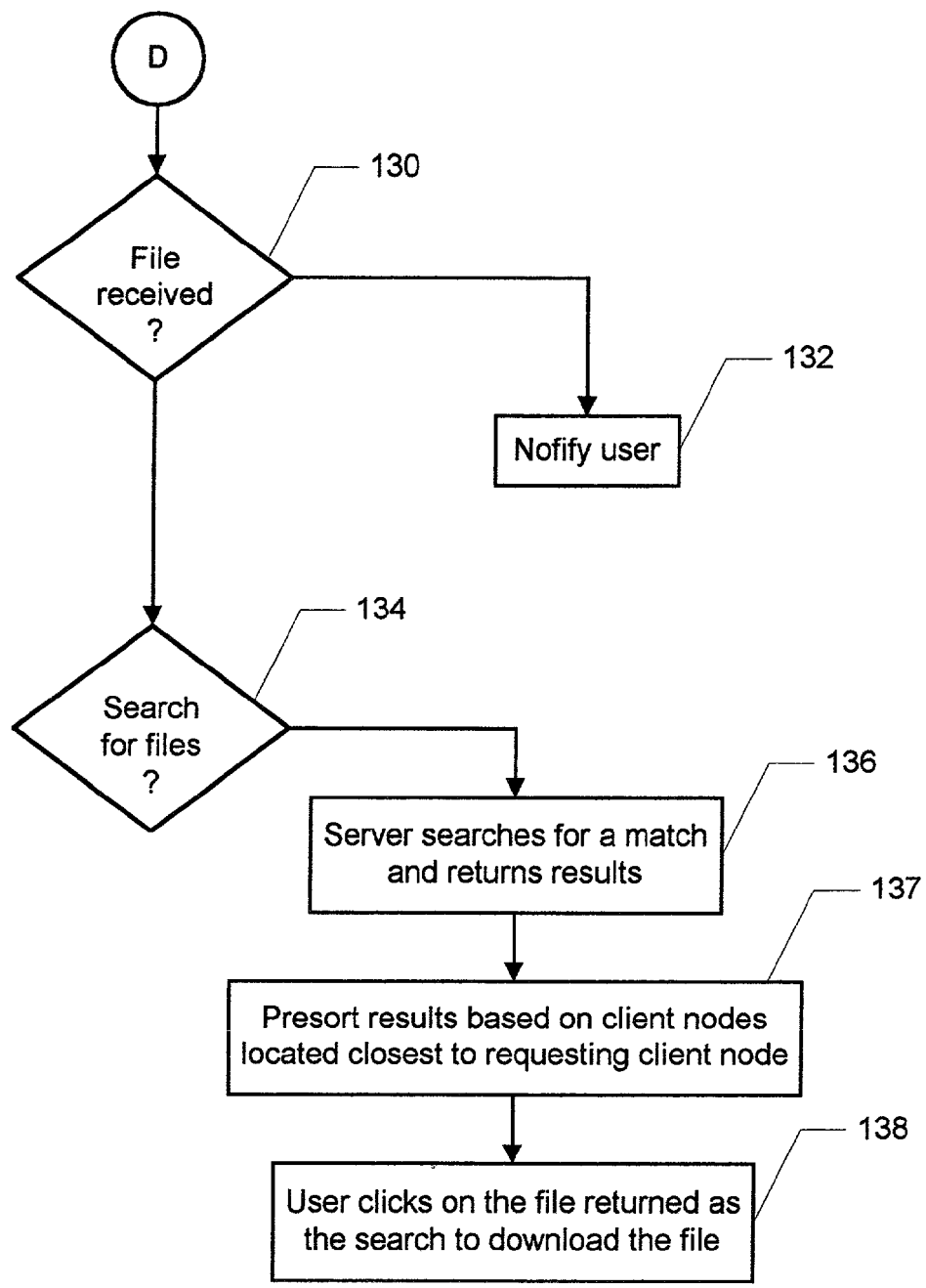

FIGS. 2A–2C are flow charts illustrating the general file sharing process in the peer-to-peer network 10 in accordance with one preferred embodiment of the present invention. The process begins by allowing a user to become a member of the network 10 by downloading and installing a copy of the P2P client application 22 on the user's computer in step 100. In a preferred embodiment, the P2P client application 22 is downloaded from one of the server nodes 12, although the P2P client application 22 may be obtained from other sources.

Next, the server node 12 receives registration information entered by the user in step 102, which includes demographic information, billing information, and e-mail address. In response, the server node 12 generates account information in step 104. The user's account information is stored in the user database 32 in step 106. When registration is complete, the user is notified and may then execute the P2P client application 22 in step 107. When the client node 12 invokes the client application 22, a client application desktop window is displayed on the computer 18.

Figure 3:
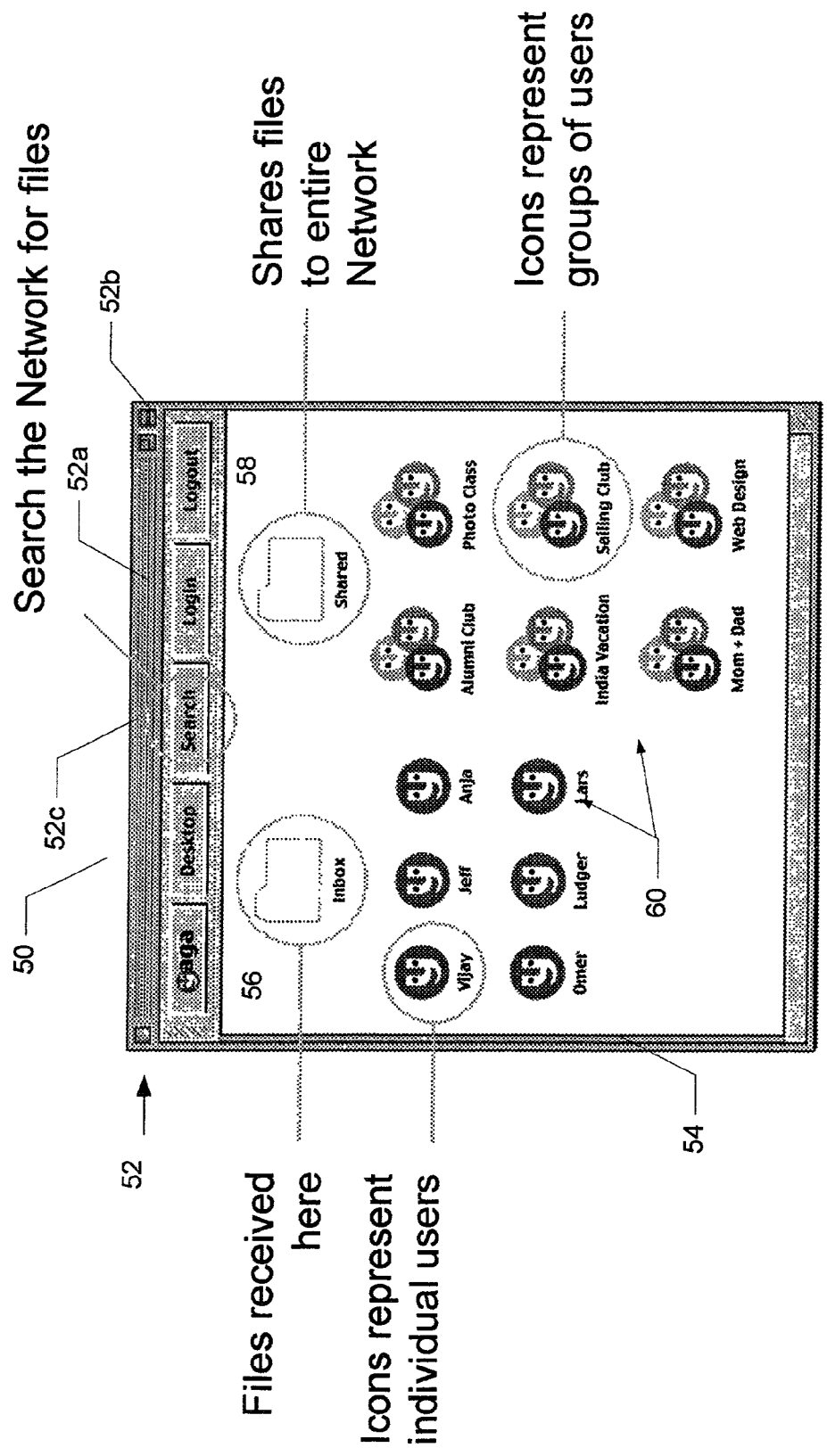
FIG. 3 is a block diagram illustrating a preferred embodiment of the client application desktop window.

Referring now to FIG. 3, a block diagram is shown illustrating a preferred embodiment of the client application desktop window. The client application desktop window 50 may include a row of command buttons 52, and an area 54 for displaying folders and icons. The user logs in and out of the network 10 via command buttons 52a and 52b, and may search for files on the network via the search button 52c. An inbox folder to 56 contains files that are received over the network 10, and a shared folder 58 contains files that the user wishes to publish over the network 10 for access by other client nodes 14. User icons 60 represent individual users and groups of users to which the user wants to exchange files with on a peer-to-peer basis.

Referring to both FIGS. 2A, 2C, and 3, the P2P client application 22 allows the user to perform four primary functions: publish and share files over the network in step 108, receive files over the network in step 130, and search for files to download in step 134.

The user may publish files over the network 10 in step 108 either publicly or privately. If the user places the file into the shared folder 58 in step 110, then the file is made publicly available on the network for search and downloading for other client nodes 14 by adding the file to a list of shared files on the server node in step 112. In a preferred embodiment, this is accomplished by adding the name of the file to the query database 22, and adding attributes of the file, such as the identity of the publishing node, the file size, the bit rate of the connection, and so on, to the location database 26.

If the user places the file onto one of the user icons 60 in step 114, then the file is privately sent by direct file transfer in step 115. If the receiving client node(s) are logged into the server node and there are no firewalls 17 on both nodes in step 116, then a peer-to-peer connection is established between the two nodes and the file is sent directly to the receiving node without first going through the server node 12.

If the receiving client node(s) 14 are not logged into the network, then the file is temporarily stored on the server node 12 and is delivered by the server node 12 when receiving client node 14 logs-in in step 118.

In accordance with the present invention, if a firewall 17 separates the publishing client node 14 from the receiving client node, then a proxy server is assigned to the publishing client node 14 for file transfer through the proxy server in step 120. The file is then transferred to the receiving node in step 122.

A file is received by a client node in step 130 when the file is deposited in the inbox 56. When the file is received, the user may be notified in step 132.

The user may also search for files published on the network by others in step 134 by clicking on the search button 52c and entering search terms. In response, the server node searches for a match for the search terms in the query database in step 136. According to the present invention, instead of just displaying a list of matching file names, the server examines the entries for the files in the location database 26, presorts the matches based on the files that are located closest to the requesting client node, and returns the results in step 137. The criteria for determining the closest client nodes include geographic location, bandwidth speed, and current network traffic. In a preferred embodiment, the server node 12 may display only the highest-ranking file to the user, rather than displaying a list of redundant files. The user may then click on the file returned as the search result to have the file downloaded in step 138, as described above.

The process for establishing a proxy server for a client node 14 protected by a firewall (step 120) so that other nodes on the network 10 may download files from the node will now be explained with reference to FIGS. 4 and 5.

Figure 4:
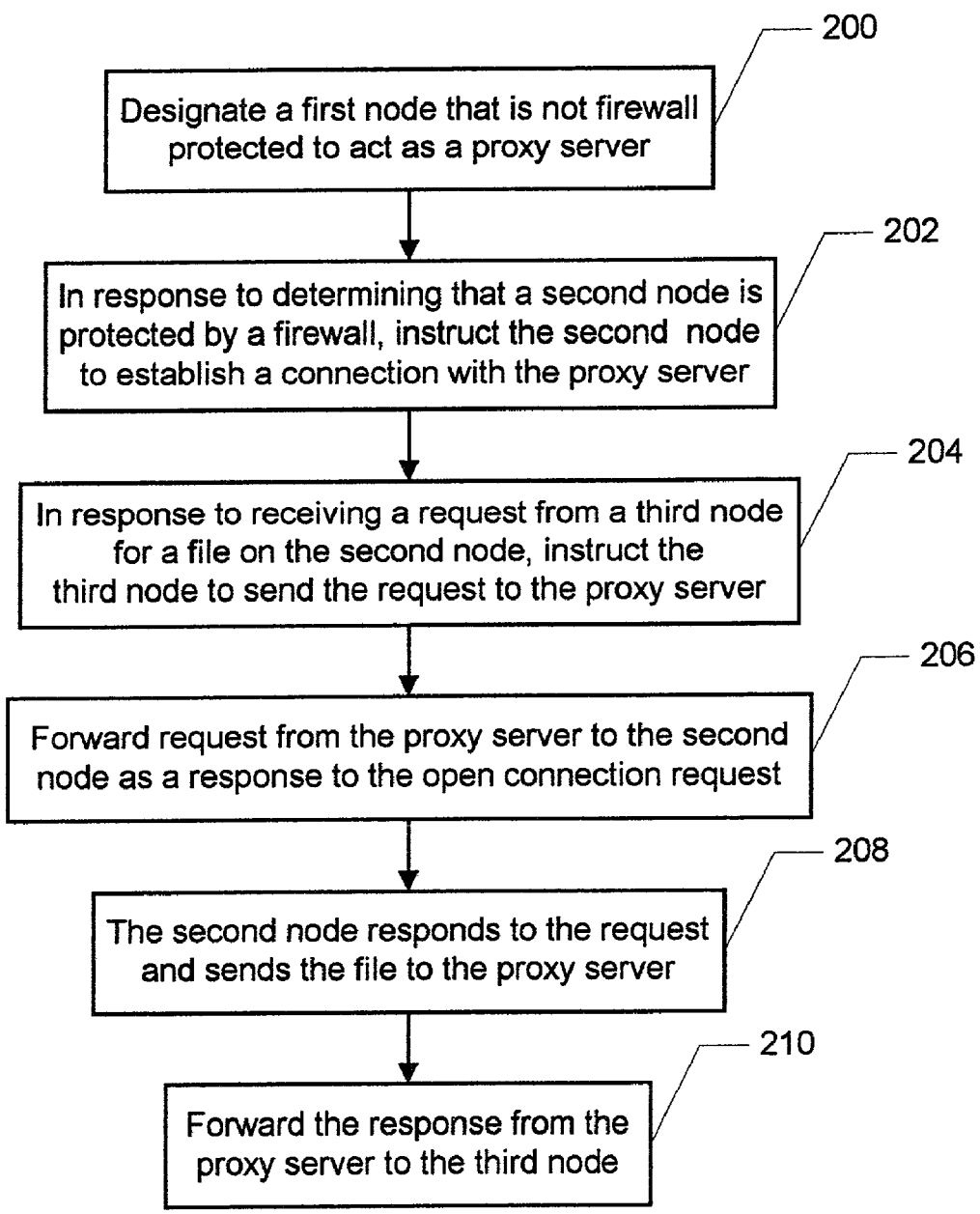
FIG. 4 is a flow chart illustrating a process for facilitating file sharing in a peer-to-peer network wherein a portion of the nodes are separated from the network by a firewall device in accordance with a preferred embodiment of the present invention.

FIG. 4 is a flow chart illustrating a process for facilitating file sharing in a peer-to-peer network wherein a portion of the nodes are separated from the network by a firewall device in accordance with a preferred embodiment of the present invention. The process begins by designating a first node that is not firewall protected to act as a proxy server in step 200. In response to determining that a second node is protected by a firewall, the second node is instructed to establish a connection with the proxy server in step 202. An open connection request is then sent from the second node to the proxy server in step 204. In response to receiving a request from a third node for a file on the second node, the third node is instructed to send the request to the proxy server in step 206. The request from the proxy server is then forwarded to the second node as a response to the open connection request in step 208, thereby allowing other nodes to access files on the second node despite the presence of the firewall device. The present invention will now be explained in further detail by way of example.

Figure 5:
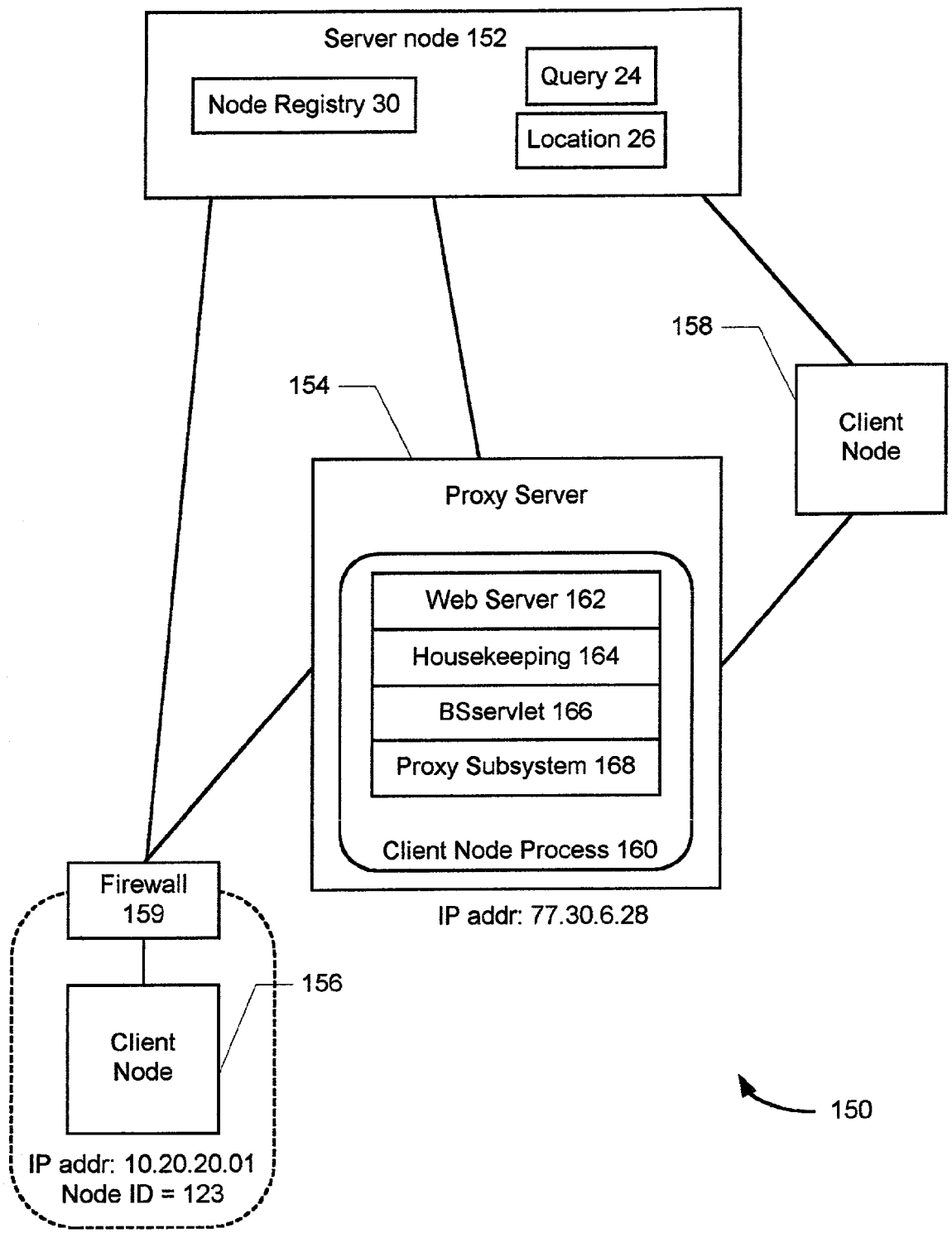
FIG. 5 is a block diagram illustrating an example peer-to-peer network operating in accordance with the present invention.

FIG. 5 is a block diagram illustrating an example peer-to-peer network operating in accordance with the present invention. The peer-to-peer network 150 is shown comprising a server node 152, and three client nodes 154, 156, and 158, where client node 156 is separated from the network 150 by a firewall 154. The server node 152 is shown including the node registry 30, the query database 24 and the location database 26. However, in alternative embodiments, the node registry and the database's 24 and 26 may be located on different computers.

The purpose of the node registry 30 is to store the node ID and IP address of each node connected to the network 150 that is not located behind a firewall, and to maintain a list of client nodes that are available for use as proxy servers.

In a preferred embodiment, when each client application is started, a client node background process 160 is invoked, which includes a web server process 162, a housekeeping process 164, and bit server (BS) servlet process 166. The web server process 16 is responsible for establishing a connection over the network 150 and for sending requests and receiving responses to and from the network 150. After a TCP/IP connection is established over the Internet, the housekeeping process 164 determines the node ID and IP address of the client node 154, and reports the node ID and IP address to the node registry 30.

The node registry 30 then determines if the client node is behind a firewall by sending a probe message to the client node, observing what IP address the client node is connecting from, and comparing the observed IP address with the reported IP address. If it is determined that the client node is not behind a firewall, then the node is designated as being available as a proxy server, and the client node's node ID and IP address are added as an entry to the node registry.

Referring to the example in FIG. 5, assume that client node 154 reports that it has an assigned IP address of 77.30.6.28. Assume further that the node registry 30 observes that the IP address that the node is connecting from is the same as the reported IP address. In that case, the client node 154 will be designated as a proxy server, it's node ID and IP address will be added to the node registry 30, and the client node 154 will be instructed to invoke its proxy subsystem process 168, creating a proxy server 154.

Now assume, that client node 156 has a node ID of 123 and is assigned IP address 10.20.20.1, and that the firewall 159 has an IP address of 36.7.1.30. When the client node 156 transmits a message out of the private network 16 to register with the node registry 30, the firewall 159 may translate the client node's IP address to the IP address of the firewall 159. If the IP address is translated, then the client node 156 will report an IP address of 10.20.20.1, but the node registry 30 will observe the IP address of the firewall 159 36.7.1.30. Due to the mismatch, the node registry 30 determines that client node 156 is behind a firewall 159, and will not register the node's node ID and IP address.

If the firewall 159 does not translate addresses, then the IP address reported by the client node 156 will match the IP address observed by the node registry 30. The node registry 30, however, will still detect that the client node 156 is behind the firewall 159 as follows. When the client node 156 sends an HTTP request to the server node 152 attempting to register, the request passes through the firewall 159 and is received by the server node 152. While the client node 156 is still connected and waiting for a response, the node registry 30 attempts to connect back to the client node 156 with a new probe message. The firewall 159 will typically block such a message and the node registry 30 will receive a "host unavailable" message in response.

When a client node, such as client node 156, is determined to be behind a firewall 159, the node registry 30 sends back a response instructing the client node 156 to connect through the proxy sever 154.

Client node 156 then sends a request to the proxy server 154 to open a connection. The request, which includes client node's 156 node and IP address, is passed to the proxy server 154, and the connection is opened via the proxy subsystem 168. Should the firewall 159 terminate the connection after some time period, the client node 156 automatically opens another connection. The proxy sever 154 then sends a message registering client node 156 with the node registry 30 using the node ID of client node 156 (123), but with the proxy server's IP address (77.30.6.28).

Now assume that client node 158 logs onto the network 150 and needs to download a file from client node 156. Client node 158 cannot directly connect with client node 156 due to the firewall 159. According to the present invention, client node 158 consults the node registry 30 and is instructed that a connection with client node 156 may be made through the proxy server 154.

The details for how client node 158 uses the proxy server to access files on firewall protected client node 156 are as follows. First, client node 158 initiates a search for the file, causing the server node 152 to querying the query database 24. The result returned from both the query and location databases 24 and 26 would show that the file is located on a client node having a node ID of 123, client node 156. The sever node 152 then searches for the node ID in the registry to retrieve the registered IP address of the client node 156. The search result, which includes the file name, node ID, and IP address, is then sent back to client node 158.

When a user of client node 158 clicks on the file to have it downloaded, client node 158 is connected through the IP address to the proxy server 154 and client node 158 transmits a request for the file. The request sent to the proxy server is identified by a request ID and includes a URL for the file.

The web server 162 on the proxy server 154 receives the request and determines if the request is intended for the proxy server 154 or another client node by examining the URL in the request. For example, a request intended for another node might include URL in the form of . . . /proxy/filepath, while a request intended for the proxy sever might include URL in the form of . . . /get/filepath. If the request is for the proxy sever, then the request is passed to the bit server (BS)servelet 166, which retrieves the file from disk and serves it back to the requester via the web sever 162.

If the request is for another node, the request is passed to the proxy subsystem 168. The proxy subsystem 168 compares the node ID in the request with the node ID of any open connections it may have, and forwards it to the node having a matching node ID. In a preferred embodiment, the request is first reformatted in a format that the receiving client node 156 can respond to (e.g., translating a /proxy URL into a /get URL).

After the client node 156 receives the request, the connection between the client node 156 and the proxy server 154 may close. The client node 156 sends a request to open a new connection and sends a response with the requested file back to the proxy server 154. The proxy server 154 then passes the response back to the requesting client node 158.

Because the proxy server responds to the firewall-protected node's request to open a connection with a request for a file, the present invention takes the response/request paradigm of conventional networks and uses it backwards: sending requests as responses and vice versa. In addition, nodes in the P2P network are configured to automatically act as proxy servers when requested in a manner that is transparent to the user of the client node. The present invention also reduces cost to operate the P2P by amortizing the cost of the proxies and not explicitly setting up and maintaining dedicated proxy servers. In addition, although the preferred embodiment of the present invention has been described as designating client nodes as proxy server, it should be understood that server nodes may also act as proxy servers by providing the server nodes with software functioning as described herein.

A method and system for facilitating file access in a peer-to-peer file delivery network has been disclosed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for facilitating file access in a peer-to-peer network, the peer-to-peer network including at least one server node, and a plurality of client nodes, wherein each of the client nodes allow users to publish and share files over the network, receive files over the network, and search for files to download, wherein a portion of the nodes are separated from the network by a firewall device, the method comprising the steps of:
   (a) designating a first client node that is not firewall protected to act as a proxy server;
   (b) in response to determining that a second client node is protected by a firewall, instructing the second client node to establish a connection with the proxy server;
   (c) sending an open connection request from the second client node to the proxy server;
   (d) in response to receiving a request from a third client node for a file on the second client node, instructing the third client node to send the request to the proxy server; and
   (e) forwarding the request from the proxy server to the second client node as a response to the open connection request, thereby allowing other client nodes to access files on the second client node despite the presence of the firewall.

2. The method of claim 1 further including step of:
   (f) sending a response from the second client node to the proxy server, and forwarding the response from the proxy server to the third client node, wherein the response includes the requested file.

3. The method of claim 2 wherein step (b) further includes the steps of:
   (i) allowing the second client node to report its IP address,
   (ii) sending a probe message to the second client node,
   (iii) observing what IP address the second client node is connecting from,
   (iv) comparing the observed IP address with the reported IP address, and
   (v) determining that the second client node is protected by the firewall when the IP addresses mismatch.

4. The method of claim 3 wherein step (b) further includes the step of:
   (i) allowing the proxy server to report its IP address,
   (ii) sending a probe message to the proxy server,
   (iii) observing what IP address the proxy server is connecting from,
   (iv) comparing the observed IP address with the reported IP address and
   (v) determining that the proxy server is not protected by a firewall when the IP addresses match.

5. The method of claim 1 wherein step (c) further includes the step of sending a message from the proxy server to a node registry that registers the second node using the IP address of the proxy server.

6. The method of claim 5 wherein step (d) further includes the step of in response to receiving a search request from the third client node for a file, returning a result to the third client node, wherein the result identifies a file name, the second client node, and the IP address of the proxy server.

7. The method of claim 6 wherein step (d) further includes the step of sending a request to the proxy server using the IP address of the proxy server, wherein the request includes a URL for the file on the second client node.

8. The method of claim 6 wherein step (d) further includes the steps of receiving the request by the proxy server, and determining if the request is intended for the proxy server or the second client node by examining the URL in the request.

9. The method of claim 6 wherein step (d) further includes the step of in response to determining that the request is intended for the second client node, reformatting the request so that the second client node may respond to the request.

10. A peer-to-peer file delivery network including at least one server node, and a plurality of client nodes, wherein each of the client nodes allow users to publish and share files over the network, receive files over the network, and search for files to download, wherein a portion of the nodes are separated from the network by a firewall device, the network comprising the steps of:

means for designating a first client node that is not firewall protected to act as a proxy server;

means for instructing a second client node to establish a connection with the proxy server in response to determining that the second client node is protected by a firewall;

means for sending an open connection request from the second client node to the proxy server;

means for instructing a third client node to send a request to the proxy server in response to receiving the request from the third client node for a file on the second client node; and means for forwarding the request from the proxy server to the second client node as a response to the open connection request, thereby allowing other nodes to access files on the second client node despite the presence of the firewall.

11. The network of claim 10 wherein a response that includes the requested file is sent from the second node back to the proxy server, and forwarded from the proxy server to the third client node.

12. The network of claim 11 wherein the means for instructing the second client node to establish a connection with the proxy server further includes:

means for allowing the second client node to report its IP address, means for sending a probe message to the second client node, means for observing what IP address the second client node is connecting from, means for comparing the observed IP address with the reported IP address, and means for determining that the second client node is protected by the firewall when the IP addresses mismatch.

13. The network of claim 12 wherein the means for instructing the second node to establish a connection with the proxy server further includes:

means for allowing the proxy server to report its IP address, means for sending a probe message to the proxy server, means for observing what IP address the proxy server is connecting from, means for comparing the observed IP address with the reported IP address, and means for determining that the proxy server is not protected by a firewall when the IP addresses match.

14. The network of claim 10 further including a node registry for receiving a message from the proxy server to register the second client node using the IP address of the proxy server.

15. The network of claim 10 wherein the means for instructing the third node further includes:

means responsive to receiving a search request from the third client node for the file, for returning a result to the third client node, wherein the result identifies a file name, the second client node, and the IP address of the proxy server.

16. The network of claim 15 wherein the means for instructing the third client node further includes means for sending a request to the proxy server using the IP address of the proxy server, wherein the request includes a URL for the file on the second client node.

17. The network of claim 15 wherein the means for instructing the third client node further includes means for receiving the request by the proxy server, and determining if the request is intended for the proxy server or the second client node by examining the URL in the request.

18. The network of claim 15 wherein the means for instructing the third client node further includes means for in response to determining that the request is intended for the second client node, reformatting the request so that the second client node may respond to the request.

19. A method for facilitating file access in a peer-to-peer network, the peer-to-peer network including at least one server node, and a plurality of client nodes, wherein each of the client nodes allow users to publish and share files over the network, receive files over the network, and search for files to download, wherein at least one of the nodes is protected from the network by a firewall device, the method comprising the steps of:

(a) instructing the firewall-protected client node to transmit a first request to a first client node on the network in order to establish an open connection with the first client node;

(b) instructing other client nodes in the network to send requests for files on the firewall-protected client node to the first client node;

(c) receiving a request on the first client node for a file on the firewall-protected client from a second client node;

(d) passing the request for the file over the open connection to the firewall-protected client node as a response to the first request;

(e) responding to the request for the file by sending a response, which includes the file from the firewall-protected client to the first client node; and (f) passing the response from the first client node to the second client node, wherein the first client node acts as a proxy between the firewall-protected node and the second client node to allow the second client node to access the file on the firewall-protected node.

20. The method as in claim 19 further including the step of waiting to respond to the first request until receiving a request intended for firewall-protected client node.

21. The method as in claim 20 further including the step of: upon termination of the connection, instructing the firewall-protected client node to reestablish communication with the first client node.

* * * * *